(No Model.)
O. LUGO.
Dynamo Electric Telegraphy.
No. 235,687. Patented Dec. 21, 1880.
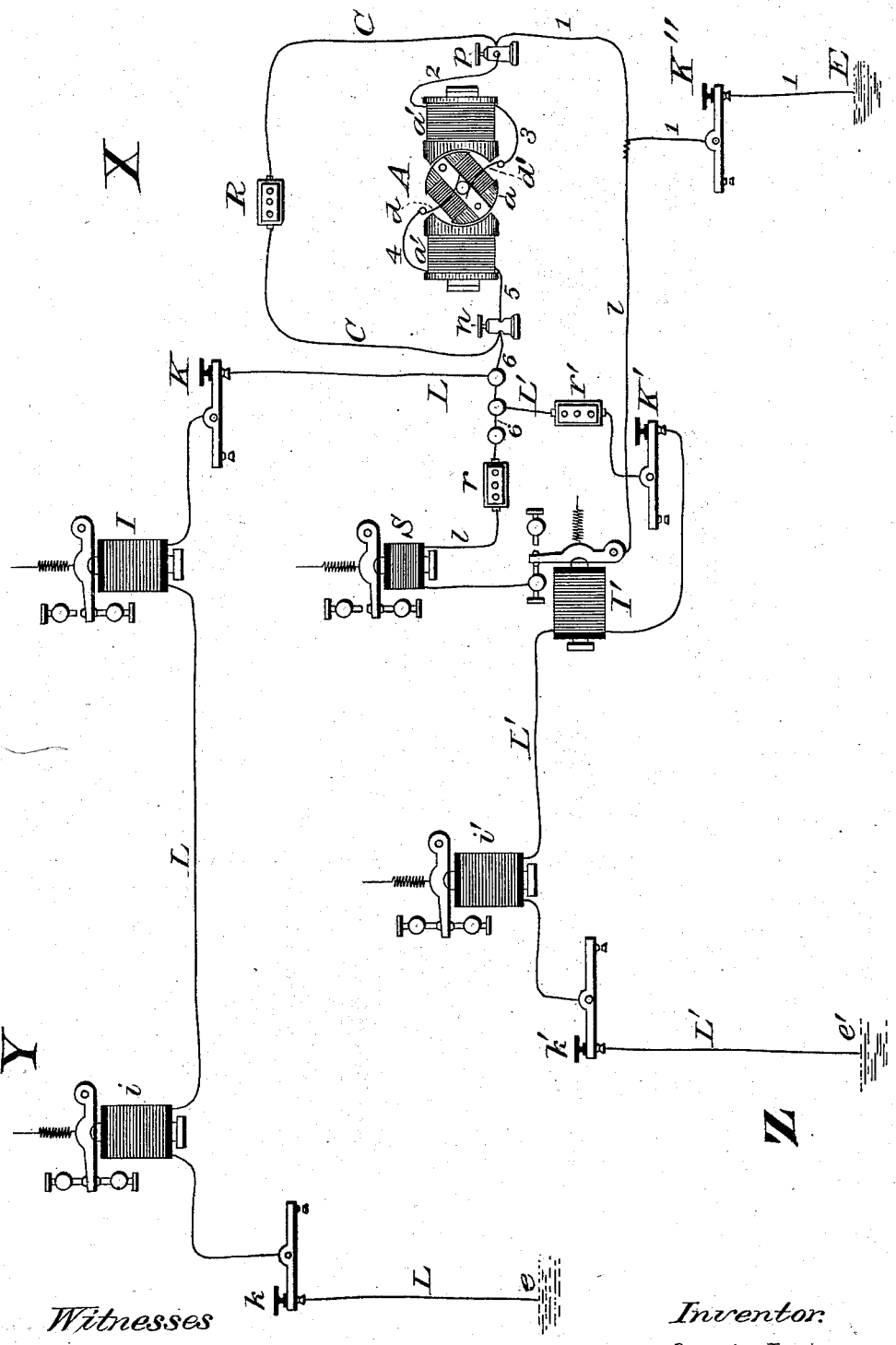

UNITED STATES PATENT OFFICE.

ORAZIO LUGO, OF NEW YORK, N. Y.

DYNAMO-ELECTRIC TELEGRAPHY.

SPECIFICATION forming part of Letters Patent No. 235,687, dated December 21, 1880.

Application filed November 11, 1880. (No model.)

*To all whom it may concern:*

Be it known that I, ORAZIO LUGO, a citizen of the United States, residing in the city, county, and State of New York, have invented certain new and useful Improvements in Dynamo-Electric Telegraphy, of which the following is a specification.

My invention relates to that class of electric telegraphs in which dynamo-electricity is employed in the transmission of signals, instead of voltaic electricity generated by chemical action.

In the application of dynamo-electric generators to the production of electric currents for telegraphic transmission certain difficulties have been encountered, arising from the presence of conditions which do not exist in various forms of voltaic batteries which have hitherto usually been employed as sources of electrical power. In the case of the chemical batteries employed for telegraphy the resistance of the circuit or circuits exterior to the battery is very considerable, while the electro-motive force remains practically constant, thus producing a working current of uniform strength in the circuit or circuits connected with the battery. In the case of dynamo-electric generators in which the reaction principle is employed the introduction into the circuit of a high external resistance, consisting of telegraph-lines which are alternately broken and closed at irregular and arbitrary intervals for signaling purposes, produces wide variations in the resistance, and subjects them to great variations in the electro-motive force, which variations are due to changes in the intensity of the magnetic field within which the currents have their origin. Furthermore, changes take place within the machine or generator itself, arising from the increase of the internal resistance by the heating of the wires and other causes. The variations referred to are also attended by changes in the amount of power required to drive the machine and in the speed of rotation of the latter, which changes again react upon the strength of the current generated.

It has been determined by experiment that the most efficient arrangement of a dynamo-electric generator — that is to say, the one which produces the greatest useful effect with a given expenditure of power — is that known as the "single-current machine," in which the coils of wire surrounding the stationary electro-magnets which maintain the magnetic field and the external resistance are all included in the same circuit.

In the attempts which have hitherto been made to operate telegraphic circuits by means of dynamo-electric generators it has been considered impracticable to make use of the single-current machines in consequence of the difficulties hereinbefore stated, and resort has been had to the class of machines known as "double-current machines," in which the armature is wound with two wires, one of these being connected in the circuit with the field-magnets and the other with the exterior circuit, in which the work is to be done, or else two separate generators have been coupled together, one being a single-current machine, whose function it is to polarize its own field-magnets and also those of the other generator, while the armature of the latter supplies the current to the exterior circuit.

My invention is designed to overcome the objections which have hitherto prevented the employment of the more efficient, simple, and economical single-current machine for telegraphic purposes, and to produce therefrom uniform and constant currents over one or many telegraph-lines of similar or varying lengths, which are operated by alternately breaking and closing the circuit in the usual manner.

The object of the first part of my invention is to enable uniform currents to be produced in telegraphic circuits by means of a single-current dynamo-generator, and to utilize these currents for the transmission of intelligible signals, which end I attain by connecting the opposite poles of the generator by a shunt-wire, or short or branch circuit, and also by including said poles in the telegraphic circuit of the main line, which is connected in multiple arc with the shunt-wire, the field-magnets of the generator being kept charged through the intervention of the constant current traversing the shunt-wire, and the proportion of such current necessary to produce signals being thrown upon or diverted to the line by the signaling apparatus, the resistance of the branch or short circuit being greater than that of the generator and less than that of the main line or lines.

The object of the next part of my invention is to vary the electro-motive force of the generator according to the work to be performed, which end I attain by combining with a shunted or short-circuited generator a telegraphic circuit or circuits and signaling-keys placed in multiple arc with said shunt-wire. The law of operation of an apparatus thus organized is that as the number of lines thrown into circuit is increased the total resistance of the circuit exterior to the generator is correspondingly diminished, and the electro-motive force of the generator correlatively increased, or vice versa.

The object of the next part of my invention is to enable intelligible signals to be transmitted through all the telegraphic circuits connected with a dynamo-electric machine by means of a single key or circuit-breaker, and to enable said signals to be received simultaneously upon one or more receiving-instruments included in each circuit, which end I attain by alternately closing and breaking the exterior circuit of said generator at a point traversed by the common current of all the telegraphic circuits, but not by that of the shunt-circuit connecting the opposite poles of the generator.

The subject-matter of my invention is specifically set forth in the claims at the end of this specification.

The essential elements of my improved organization are a single-current dynamo-electric machine or generator of any of the well-known and improved forms of construction, a shunt-wire or short circuit connecting its opposite poles, an electric or telegraphic circuit or circuits connected with the poles of said armatures, and signaling apparatus of well-known construction.

The accompanying drawing represents a diagram of an organization of apparatus embodying my invention. The details of the apparatus shown and arrangement of such apparatus with reference to the circuits may, however, be modified in various ways without departing from the principle of my invention. In this instance three stations are shown—a main or central station, X, and two terminal stations, Y and Z. The organization shown is well adapted for lines of ordinary length. For long circuits, however, it would be preferable to place a generator at each end of the line, taking care that their respective unlike poles are presented to the line. The running of the circuits under my improved system is substantially the same as that used where voltaic or chemical batteries are employed—that is to say, the proper relative polarities of the apparatus must be maintained throughout. The instruments of a large number of stations under this organization may be operated from a single generator.

In the accompanying drawing, A represents a dynamo-electric generator, which may be of any suitable or well-known construction, and driven by power in the usual manner.

The generator which I prefer to use has its component parts arranged upon the principle shown in the diagram, in which $a$ is a revolving armature enveloped in coils of wire which move within the magnetic field of the stationary or field magnets $a'\ a'$. The positive and negative poles of the generator are at $p$ and $n$, respectively, and the circuit through the machine or generator is as follows: Commencing at the positive pole $p$, it passes by wire 2 to the coils of one of the field-magnets $a'$, thence by wire 3 to the commutator-spring $d'$, thence through the coils of the rotating armature $a$; thence by commutator-spring $d$ and wire 4 to the other field-magnet, $a'$, and thence by wire 5 to the negative pole $n$. Now, if the generator be set in motion, no effect is produced until its opposite poles, $p$ and $n$, are connected by a conductor of electricity; but as soon as this is done a weak current is excited in the coils of the armature $a$, which also traverses the field-magnets $a'\ a'$ and the conductor connecting the poles, which conductor is technically termed the "exterior circuit." The current excites magnetism in the cores of the field-magnets, which reacts upon the armature, and this action and reaction continue until the cores reach their maximum of magnetism, or the attraction between the revolving and stationary parts of the generator reduces the speed of the armature, and an equilibrium is established between the mechanical resistance produced by the attraction and the power which drives the machine, after which the current developed will remain practically uniform so long as the resistance of the exterior circuit remains unchanged; but if the exterior circuit is broken the field-magnets and armature are instantly discharged, and the maximum power can only be regained by a series of actions and reactions after the circuit has been restored, as hereinbefore set forth. If the poles $p$ and $n$ of the generator A be connected by a second conductor, technically termed a "shunt-circuit," the resistance of that portion of the circuit exterior to the generator will be diminished, and for that reason a greater quantity of electricity will be produced by the generator; and, moreover, under this arrangement, if the branch or branches of the exterior circuit be broken or disconnected, the current through the field-magnets and armature will still be maintained through the unbroken shunt, so that the generator will continue to act, though with somewhat diminished effect.

Referring again to the drawing, A represents the dynamo-electric generator, having its armature-coils $a$ and field-magnets $a'\ a'$ connected together in the same circuit, as hereinbefore set forth. The exterior or working circuit consists of the wire 1, which connects the positive pole $p$ of the generator A with the earth at E, (and which, together with the earth itself, forms a conductor of no appreciable resistance,) the wire 6, also of no appreciable resistance, and three telegraphic circuits, L, L', and *l*, which branch from the wire 6 at the negative pole of said generator, and terminate, the first two in the earth at *e* and *e′*, respectively, and the third in the wire 1 at the positive pole. These three circuits, which, taken collectively, form essentially the whole of the exterior or working circuit, are of very different lengths, and consequently their normal resistances vary in like proportion. The exterior resistance, therefore, is represented by the joint resistance of the three circuits, which, by a well-known law, is much less than that of any one of them individually.

The telegraph-lines L and L′ are each provided with transmitting-keys K *k* K′ *k′*, for alternately breaking and closing the circuit in order to transmit intelligible signals, and also with suitable receiving-instruments I *i* and I′ *i′*, these being placed at different stations, as shown.

The line *l l* represents a local circuit of small resistance, which is employed to actuate a sounder or other like instrument, S, through the intervention of the instrument I′, which is shown as a relay.

The shunt-circuit C C connects the positive and negative poles *p* and *n* of the generator A, as already explained, and it, in effect, forms a branch of the exterior circuit.

Experiment has shown that the greatest useful effect is produced in the operation of a dynamo-electric generator when the resistances of the interior and exterior circuits are approximately equal to each other; and to enable this relation to be maintained I provide adjustable rheostats or resistances R *r r′*, of well-known construction, the first-named being placed in the shunt-circuit C and the others in the two shorter of the telegraphic circuits attached to the negative pole *n* of the generator. By this means the resistances of the shorter lines may be so increased that joint resistance of the exterior or working circuit will be very great compared with that of the generator and its shunt, by which another important advantage is secured, in that the system becomes automatically self-regulating. The current required for operating even a larger number of lines of considerable resistance is far within the capacity of the generator to supply. If, in closing and breaking the several circuits by means of the keys, a considerable number of the lines should happen to be opened simultaneously, the resistance of the external circuit becomes greater, and consequently the current through the field-magnets is weakened, and the electro-motive force of the generator correspondingly decreased, while the opposite effect follows if all the lines are closed and more current is required. Thus, by placing adjustable rheostats in all the branches of the exterior circuit except the one having the greatest resistance, the proper relations of resistance between the working-circuits, the shunt-circuit, and the generator may be preserved at all times.

I also remark that the shunt-circuit C C must always be of a resistance exceeding the internal resistance of the generator, so that the heat developed in the circuit will appear in the shunt-circuit, and not within the generator—an incidental advantage of much importance, as the machine is thus kept cool. Its internal resistance therefore remains constant, and the current derived therefrom is consequently uniform.

It is often important to be able to transmit the same intelligence simultaneously over a great number or over all the circuits radiating from a central station, as in the distribution of press-news and the like. By means of the organization shown I am able to accomplish this result with great convenience simply by inserting a transmitting-key, K″, at a point in the exterior circuit of the several telegraph-lines, as L and L′, but not in the circuit of the shunt-wire C. It is obvious that by manipulating this key the signals will be received on all the instruments I *i* I′ *i′* in the circuit of several telegraph-lines.

I do not claim herein the specific combinations and arrangement of mechanism and circuits which are shown and described in this application, as these are fully described and claimed in my pending application for Letters Patent filed on or about the 9th day of November, A. D. 1880, to which reference is had.

I claim as my own invention—

1. As an improvement in the art of dynamo-electric telegraphy, the method hereinbefore described of producing intelligible signals in a telegraphic circuit by generating dynamo-electric currents in branch circuit with the main line, the resistance of the branch circuit being greater than that of the generator and less than that of the main line or lines.

2. As an improvement in the art of dynamo-electric telegraphy, the method hereinbefore described of automatically varying the electro-motive force of the generator, by merely throwing the line-wire into or out of circuit.

3. The combination, substantially as hereinbefore set forth, of a dynamo-electric generator, a constantly-closed shunt-circuit, and one or more telegraphic circuits, all connected in multiple arc with said generator, one or more instruments for receiving intelligible signals included in each of said telegraphic circuits, and a key or circuit-breaker placed in the exterior circuit of the generator at a point traversed by the common current of all the telegraphic circuits, but not by that of the shunt-circuit.

In witness whereof I have hereunto set my hand this 11th day of November, A. D. 1880.

ORAZIO LUGO.

Witnesses:
WOODBURY LOWERY,
E. C. DAVIDSON.